Figure 1:
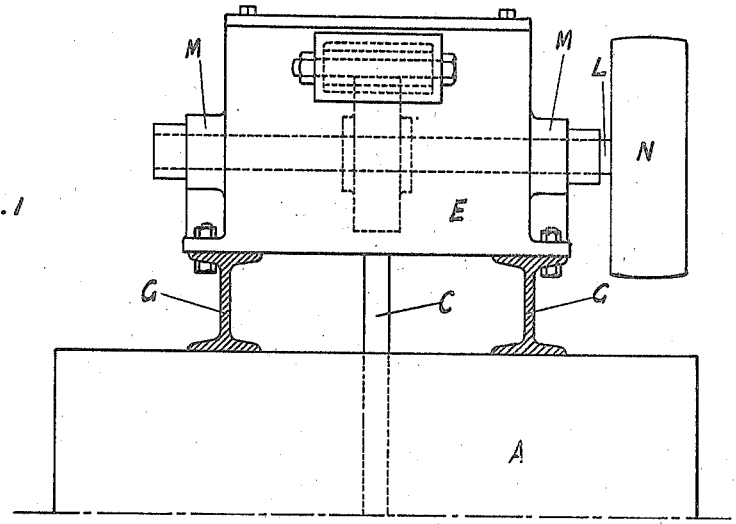

Jan. 9, 1923.

H. W. McL. CHRISTIE.

METHOD OF DISCHARGING SLUDGES AND LIKE SEMISOLID MATTERS FROM TANKS OR OTHER VESSELS.

FILED MAR. 14, 1922.

1,441,966.

INVENTOR:-
Henry William McLean Christie
by his Attorneys
Howson and Howson

Patented Jan. 9, 1923.

1,441,966

UNITED STATES PATENT OFFICE.

HENRY WILLIAM McLEAN CHRISTIE, OF ARDEN, SCOTLAND.

METHOD OF DISCHARGING SLUDGES AND LIKE SEMISOLID MATTERS FROM TANKS OR OTHER VESSELS.

Application filed March 14, 1922. Serial No. 543,739.

*To all whom it may concern:*

Be it known that I, HENRY WILLIAM McLEAN CHRISTIE, a subject of the King of Great Britain and Ireland, and a resident of Arden, Dumbartonshire, Scotland, have invented certain new and useful Methods of Discharging Sludges and like Semisolid Matters from Tanks or Other Vessels.

The invention has for its object a method of handling materials or stuffs in the form of sludges, precipitates, or slimes, and consisting of intimate mechanical mixtures of highly comminuted solid materials and a liquid. Such mixtures, owing to their physical state of adhesive plasticity, are very difficult to handle. They will not flow, they can hardly be shovelled or handled by elevators, and they cannot be pumped. That is to say, being in a condition between the liquid and the solid, they can neither be handled readily by methods applicable to liquids nor by methods applicable to solids.

According to the invention, stuffs of this class respond to vibration transmitted to them in any convenient manner and by any convenient means. It is to be pointed out, however, that all plastic stuffs are not amenable to this vibratory treatment but only such as contain at least a definite proportion of matter crystalline in structure in contradistinction to the truly amorphous—even although the crystalline structure may be of microscopic dimensions. Matters or stuffs amenable to the vibratory treatment contain not less than sixty parts, by weight, of crystalline solids in every hundred parts of solid constituents, and it has been found that stuffs of these proportionate contents although normally unflowable and cohesive, (in the words of the chemist "liver-like") become fluid under the influence of vibration and may thus be readily handled—for example, caused to flow readily from the discharge outlet of a container.

By way of example, the following stuffs may be considered as fulfilling the necessary conditions:

Finely divided or finely ground or precipitated calcium carbonate, barium sulphate, lead sulphate, carbonate of magnesium, sulphate of calcium, carbonate of barium, carbonate of strontium, finely powdered stone having a crystalline structure, fine sand, and the sludge which is produced in the manufacture of caustic alkalis by the reaction of alkaline carbonates upon the oxides of calcium, strontium, or barium.

If any one of these last mentioned sludges (and which usually contain from 40% to 50% of water) be taken as a typical example, and be subjected to vibrations, then for so long as the vibrations continue, the material will flow from an orifice of a vessel in which it is contained just as a viscous liquid would do, and may be controlled just as a liquid may. But as soon as the vibrations cease, the sludge ceases to flow.

While any frequency of vibration will cause the stuff to flow, it has been found that a low rate, such as five per second, induces only a very slow rate of flow. Increase of flow occurs with increase in the frequency until a certain point is reached beyond which increased frequency does not materially increase flow—that is to say, the proportionate increase of flow does not continue. A frequency of vibration of the order of thirty per second may be considered as the economic optimum.

Figure 2:
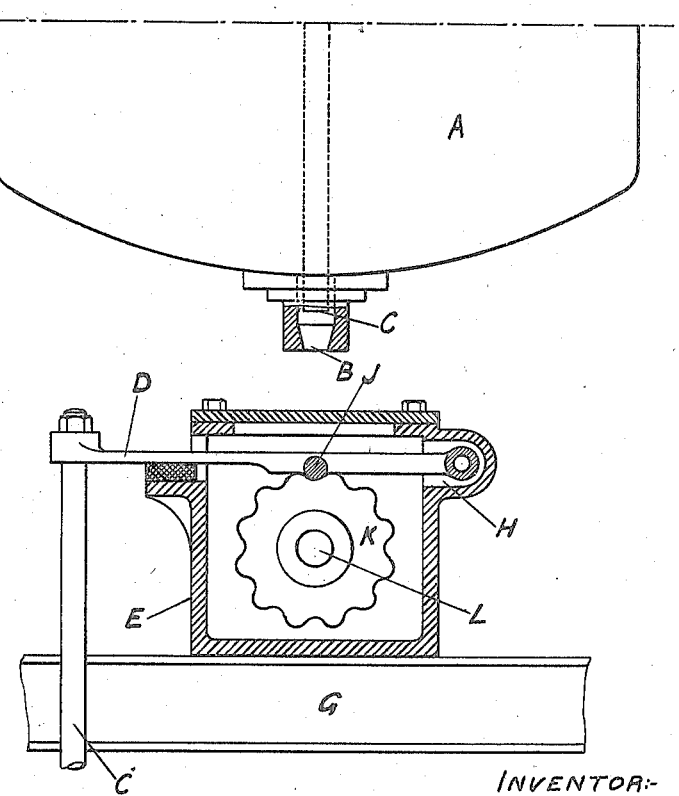

Vibration may be communicated to the sludge or stuff in any convenient manner and by any convenient means. For instance, and merely by way of example, without limitative effect, a suitable form of apparatus is shown on an accompanying sheet of explanatory drawings, Figure 1 thereof being a side elevation of such apparatus and Figure 2 a tranverse section of part thereof.

This drawing shows a tank A which may be of any desired form, and from which it is desired to discharge the sludges or like semi-solid stuffs, of the nature hereinbefore referred to, with which it may be more or less filled. A discharge aperture B is formed in the bottom of the tank and to cause the stuff to flow through this aperture, there is provided a rod C, one end of which projects slightly into the discharge aperture. The rod C extends through the tank A, and is connected at its upper end to one end of a forked lever D projecting out through an opening in one side of a box E supported by girders G above the tank. The opposite end of the lever D is pivoted in a recess H in the other side of the box, and the lever carries between the forked parts thereof a tappet J which bears on a cam wheel K on a shaft L carried in bearings M in the ends of the box, a pulley N or other means of imparting rotation to the shaft L, is secured to the outwardly projecting end of the shaft. This motion, through the rotation of the cam wheel K, imparts the desired vibration to the lever D and rod C and consequently to stuff.

Alternatively the vibrations may be transmitted to the discharge duct or parts of the vessel adjacent to it.

What I claim is:

1. The method of discharging from a vessel having a discharge aperture, a plastic material normally unflowable therefrom, which consists in applying high frequency vibrations directly to and within the body of the material while in the vessel.

2. The method of discharging from a vessel having a discharge aperture, a plastic material normally unflowable therefrom, which consists in applying vibrations of an approximate frequency of thirty per second directly to and within the body of the material while in the vessel.

In testimony whereof I have signed my name to this specification.

HENRY WILLIAM McLEAN CHRISTIE.